United States Patent [19]

Nygaard

[11] 3,997,996
[45] Dec. 21, 1976

[54] METHOD OF BAITING HOOKS AND APPARATUS FOR CARRYING OUT THE METHOD

[75] Inventor: William Nygaard, Oslo, Norway

[73] Assignee: Mustad Industrier A/S, Oslo, Norway

[22] Filed: Feb. 3, 1976

[21] Appl. No.: 655,035

Related U.S. Application Data

[63] Continuation of Ser. No. 527,558, Nov. 27, 1974, abandoned.

[30] Foreign Application Priority Data

Jan. 7, 1974 Norway .................................. 37/74

[52] U.S. Cl. .................................................. 43/4
[51] Int. Cl.² ........................................ A01K 91/00
[58] Field of Search ........................... 43/1, 4, 4.5

[56] References Cited

UNITED STATES PATENTS 2,511,828  6/1950  Andrist ..................... 43/4
3,377,733  4/1968  Godo ....................... 43/4

*Primary Examiner*—Warner H. Camp
*Attorney, Agent, or Firm*—Ladas, Parry, Von Gehr, Goldsmith & Deschamps

[57] ABSTRACT

Method for baiting hooks secured to a line by means of a snood, in a baiting apparatus to ensure baiting of each hook when pulled through a hook guide and past a bait holder. Prior to hooking the hook into the bait piece the inside of the hook curve is brought into engagement with a movable member to reduce the advancing rate of the hook and together with the hook curve form an enlarged bearing surface against the bait piece to facilitate and ensure conveyance of said bait piece, whereafter the member is released from the hook and returned to starting position. The movable member being a finger for formation of an auxiliary bearing surface between the hook and the bait piece.

2 Claims, 3 Drawing Figures

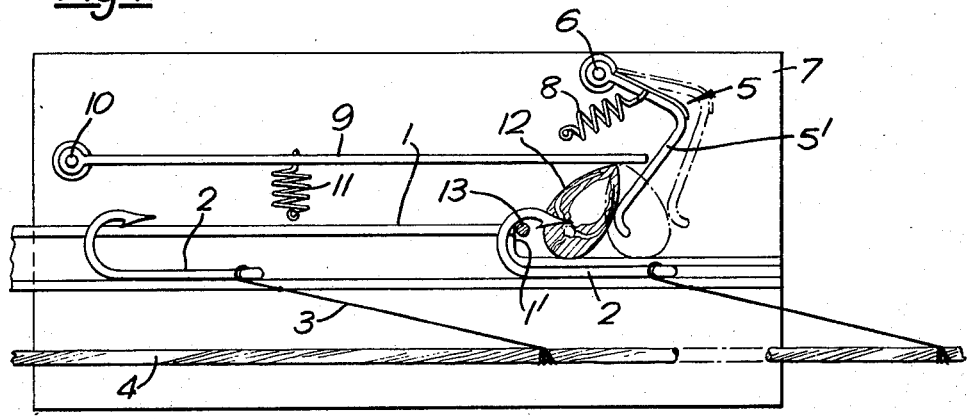
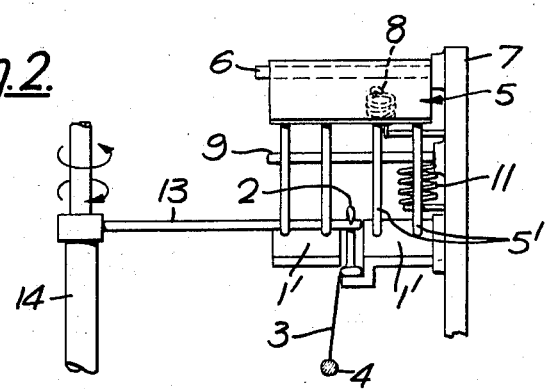
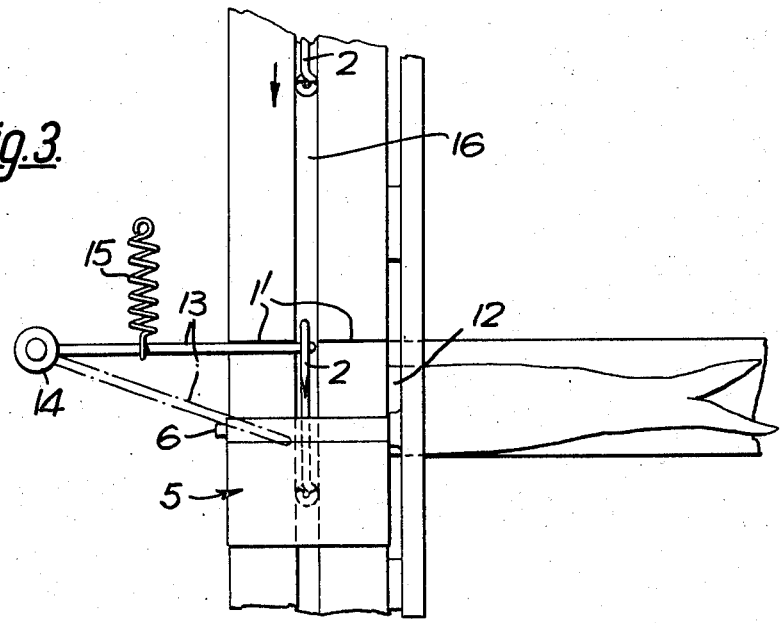

METHOD OF BAITING HOOKS AND APPARATUS FOR CARRYING OUT THE METHOD

This is a continuation of application Ser. No. 527,558 filed Nov. 27, 1974 and now abandoned.

The present invention relates to a method of baiting hooks attached to a line by means of a snood, in a baiting apparatus where the hooks are drawn through a hook guide to and past a baiting position for hooking of a bait piece which, by suitable means, is disposed in a bait holder and retained releasably therein. The invention further relates to a means in a baiting apparatus for carrying out the method and comprising a hook guide for advancing hooks by means of line and snood to and past a baiting position with the points of the hooks facing upwardly and forwardly for hooking a piece of bait which, by suitable means, is disposed in a bait holder and releasably held therein.

A number of different methods for baiting fish hooks are known and also baiting apparatus for carrying out such methods. In a known baiting apparatus of the type described hereinabove, where the bait is forwarded to baiting position and cut into pieces by means operated through suitable power transference, and the forwarding of the bait and cutting of a new piece for hooking onto the next hook are controlled by means of, for example, a retaining flap which retains the bait during hooking, the said retaining flap is, for example, pivotally mounted so that on the action of spring force it yields and releases the bait and hook on the further movement of the hook through the baiting apparatus. The pivotal movement of the retaining flap is then used to initiate forwarding and cutting of the bait.

If the bait is soft, for example, when defrosted frozen herring is used, the cut bait piece may be so soft that the hook passes through the bait, leaving nothing on the hook, and past the retention flap. The retention flap does not then perform any pivotal movement nor initiate any forwarding and cutting of a fresh piece of bait. The next hook to be passed through the baiting apparatus may also pass straight through the bait piece and, at the worst, the risk arises that an entire line may be drawn through the baiting apparatus without the hooks being baited.

The object of the present invention is to provide a method for baiting hooks, and a baiting apparatus for carrying out the method, in order to eliminate the above described disadvantage in certain types of baiting apparatus.

According to the invention this is achieved by increasing the contact surface which is to convey a bait piece from baiting position during hooking of the bait, and this is achieved according to the invention in that a member is brought to bear against the inside of the curve of the hook prior to hooking of the hook into the bait piece, the said member, during the further advance of the hook, slows the advancing rate thereof and comes into engagement between the inside of the hook curve and the bait piece and, in so doing, facilitates and ensures conveyance thereof. The said member, which is introduced into the hook curve, forms a bearing surface for the bait piece in addition to the bearing surface formed by the inside of the hook curve and the hook cannot then so readily pass into or through a soft piece of bait and the bait piece is thus securely hooked onto the hook and is conveyed thereby out of the baiting apparatus.

If the bait piece should be so soft that it is not engaged by the hook, despite the increased bearing surface produced by the combination of the said member and hook curve, the advance and cutting of a new piece of bait is ensured since the member brought into engagement with the hook carries out a movement during the advance of the hook for activating the means for advancing and cutting a fresh piece of bait. Any piece of bait which has not been conveyed by the hook is then pushed out of the bait holder which receives a fresh piece of bait.

A baiting apparatus for carrying out the method according to the invention includes a finger extending transversely of the upper side of the hook guide and adjacent to the bait holder for engaging the hook prior to or during its hooking into the bait and forms an auxiliary bearing surface between the curve of the hook and the bait piece, the said finger being pivotable against a return force in the advancing direction of the hook to brake the rate of hooking and thereafter release of the hook with the bait piece, after a determined pivotal movement of the finger which activates the means for disposing fresh bait in the bait holder.

Further characterizing features of the invention will be apparent from the claims, and the invention is further described in the following with reference to the drawing where FIG. 1 shows in diagram a fundamental embodiment of the baiting apparatus according to the invention for carrying out the method according to the invention.

FIG. 2 is the same viewed from the front, i.e. the hooks advance towards the viewer, and FIG. 3 is the same seen from above.

The baiting apparatus according to the invention comprises a hook guide 1 for hooks 2 secured by means of snood 3 to a line 4 which draws the hooks from a hook reservoir (not shown) to the baiting apparatus for baiting of the hooks before casting. The baiting apparatus includes further, as illustrated in FIG. 1, a retention flap 5 pivotally mounted at 6 in a frame 7 to which other components of the baiting apparatus are also secured. The retention flap 5 is pivotable in the advance direction of the hooks 2 against a spring force produced by a tension spring 8 secured to the retention flap 5 and the frame 7. A horizontally extending arm 9 mounted at 10 in the upstream direction from the retention flap 5, is spring biased by means of the spring 11 in downward direction, but can, by means not shown, be raised for introduction of a bait piece 12 beneath the end portion thereof and upstream with respect to the lower portion of the retention flap 5, such that the arm 9 on being released, presses the bait piece 12 downwardly to close contact with the upper side of the hook guide 1 and the lower portion of the retention flap 5, positioned obliquely in order to achieve a suitable orientation of the bait piece for hooking on the hook 2, when the bait piece consists of a piece of cut fish, for example, herring, which is disposed with its back downwardly against the upper side of the hook guide 1. To facilitate retention of the bait piece, the upper side of the hook guide is stepped as illustrated at 1', the said step forming a support for the bait piece upstream with respect to the retention flap 5. At the step 1', a finger 13 is further mounted transversely of the hook guide 1, said finger 13 being rotatable in the horizontal plane about a perpendicular pivoted axis in the mounting 14. The finger 13 projects inwardly above the point 16 in the hook guide 1 so as to intercept the hook 2 which is pulled through the baiting apparatus by means of the line 4. The finger 13, which is spring biased against rotation by means of a tension spring 15, inhibits the movement of the hook 2 in that both the snood 3 and line 4 are tightened so that the hook hooks into the bait piece 12 at reduced speed while the finger 13, at the same time, forms a bearing surface for the bait piece 12 in addition to the bearing surface on the inside of the hook curve. The cross-shaped bearing surface thus formed ensures conveyance of the bait piece in substantially all cases even though the bait is extremely soft.

Activating of the means for advancing and cutting of a fresh bait piece with simultaneous disposition thereof in the bait holder is achieved in that the finger 13, on its pivotal movement, initiates feeding and cutting of a fresh bait piece 12 which displaces any bait piece too soft to be conveyed by the hook.

In order to achieve an even better hooking of the bait, the so-called double hooking, the lower limitation of the retention flap 5 bears against the bait piece 12 at a determined height above the upper side of the hook guide 1 so that the hook 2, when striking the bait piece with its point, and pushing the bait piece in forward direction by means of the inside of the hook and the finger 13, disposed at a lower level than the retention flap 5, rotates the bait to the position indicated in broken lines as illustrated on FIG. 1 whereby the hook is forced through the back portion of the bait piece during rotation thereof.

The lower portion of the retention flap 5 may be slotted so that juxtaposed fingers 5' are provided which, in part, are biased against the bait piece 12 and which also permit through guiding of the hooks 2 when no bait piece has been disposed in the bait holder or when the hook passes through a too soft bait piece.

Having described my invention, I claim:

1. A method of baiting a hook which is secured to a line by a snood for facilitating and ensuring hooking and conveyance of a bait piece, comprising the steps of advancing the hook along a predetermined path with its point directed along said predetermined path towards the bait piece; placing a finger member in the curve of the hook so that as the hook advances, it engages the finger member; applying force to the finger member to resist advancing movement of the hook; inserting the point of the hook into the bait piece until the bait piece is engaged by the finger member and the inside of the curve of the hook, whereby forces accelerating the bait piece are distributed over both the inside of the curve of the hook and the finger member; subsequently withdrawing the finger member from the curve of the hook; and returning the finger member to its position before it was engaged by the hook.

2. Baiting apparatus for baiting a hook secured to a line by a snood, comprising a hook guide defining a path of movement along which the hook can be advanced with the point of the hook directed along the path of movement, a bait piece holder to hold releasably a bait piece in front of the point of the hook, a finger member pivotally mounted adjacent to the hook guide and having a free end extending into the path of movement of the hook at a position just to the rear of the bait piece so that as the hook is advanced along said path the finger member enters the curve of the hook and is engaged by the hook to bring about pivotal movement of the finger member into contact with said bait piece until a position is reached such that, by virtue of said pivotal movement, the free end of the finger member is withdrawn from the curve of the hook and out of contact with said bait piece, and return force means effective to return the finger member to the position with its free end just to the rear of another bait piece, the position at which the free end of the finger member is withdrawn from the curve of the hook being forward of the position in which the bait piece is held by the bait piece holder.

* * * * *